Patented Sept. 14, 1937

2,093,337

UNITED STATES PATENT OFFICE 2,093,337

MANUFACTURE OF SIZED PAPERS

Oscar F. Neitzke, Belmont, Mass., assignor to Bennett Incorporated, Cambridge, Mass., a corporation of Massachusetts No Drawing. Application March 23, 1935, Serial No. 12,731

14 Claims. (Cl. 92—21)

This invention relates to the manufacture of sized papers, paper boards, and other paper products. It deals more particularly with sized paper products whose manufacture involves the preparation and use of new and advantageous aqueous sizing compositions in the form of aqueous dispersions or emulsions which lend themselves to incorporation into the papermaking stock and whose dispersed or emulsified sizing content can be precipitated or fixed on the stock before the stock is run off on the papermaking machine.

I have discovered that the substantially involatile pyrogenous residue, which is obtained from the fractionation or distillation of the liquid resin or oleaginous content of spent chemical pulping liquors, is a highly satisfactory paper-sizing ingredient provided that it is properly dispersed or emulsified in water and thereby transformed into an aqueous sizing composition that can be incorporated uniformly into papermaking stock and precipitated or fixed in the stock in much the same way as are the aqueous sizing compositions heretofore employed. While the pyrogenous residue employed as paper-sizing according to the present invention may be derived from various kinds of spent chemical pulping liquors, including kraft or sulphate liquors, it is derived in large quantity and most economically from spent soda pulping liquor in which Southern pine has been reduced to pulp. In cooking or pulping wood by the soda process, one produces a black or spent liquor containing the organic matter dissolved from the wood and spent sodium compounds. In regenerating or recovering the valuable sodium constituent of the spent or black liquor for re-use, the practice is to subject the spent liquor to concentration by evaporating considerable of its water content as in multiple-effect evaporators. The concentrated liquor is then put through other regenerating steps leading to a fresh soda cooking liquor. When the spent liquor is derived from the cooking or pulping of Southern pine, it is found that the concentrated spent liquor contains a considerable amount of resin and fatty acid soap, which salts out of the concentrated liquor. It is the practice to remove or skim off this soap from the concentrated liquor before the liquor proceeds to the other recovery treatments. The soap thus recovered from the concentrated liquor is treated with mineral acid which serves to liberate or precipitate as an oleaginous liquid the resin and other fatty acids present. The precipitated liquid, sometimes known as "tallol" or liquid rosin, is then subjected to distillation, during which operation a heavy oil is distilled off. On cooling of the oil distillate, abietic acid crystallizes out of solution and is removed therefrom as almost pure rosin, whereas the oil, which is high in fatty acids, is sold as a substitute for red oil. The pyrogenous or involatile residue in the still is the material that is employed as a paper-sizing agent in accordance with the present invention. This residue is a thermoplastic solid of dark color, is substantially involatile even at 400° to 500° F., and comprises largely unsaturated hydrocarbons and carbonaceous material. Such residue can be and is produced with fairly definite and reproducible characteristics, for, after distillation of the volatile oil, the still may be heated for the desired period of time to transform the involatile residue into an end-product of the desired melting point, penetrability, and other qualities. Unlike rosin, liquid rosin or "tallol", and rosin pitch, only a subordinate fraction of the residue is saponifiable. Thus, a typical distilled residue such as is available on the market requires only 4% caustic soda, based on the weight of residue for saponification, whereas ordinary grades of solid rosin, liquid rosin or "tallol", and rosin pitch require from 8%–12% of caustic soda, based on the weight of rosin, for complete saponification.

Despite the fact that the pyrogenous residue employed as a paper-sizing in accordance with the present invention is of a chemical composition quite different from that of rosin, I have found that it can be transformed into an aqueous sizing composition which not only lends itself to use much in the same way as ordinary rosin size but whose sizing effectiveness in paper compares favorably with that of rosin size and which imparts to paper other valuable properties. This finding is of great commercial significance, since it makes possible the use of a by-product of pulp manufacture in the production of sized papers; and inasmuch as pulp mills also frequently engage in the manufacture of paper, it becomes possible for such mills to use a by-product produced at a cost significantly lower than that of rosin.

The pyrogenous residue may also be employed to good advantage in the production of a wide variety of mixed aqueous sizing compositions. For instance, it may be combined or blended to advantage with one or more of such thermoplastic sizing agents as asphalt, hydrocarbon wax, rosin, or the like, since I have found that when melted together with such agents a non-separating mixture or blend is produced. In other words, the residue is miscible in all proportions with such other agents upon being melted therewith. In producing aqueous sizing compositions from the distilled residue alone or from a mixture of the residue and other thermoplastic sizing agents, I first melt the residue or the thermoplastic mixture in which it is present and commingle the melt with a suitable saponifying solution, preferably a dilute caustic soda solution, which reacts with the saponifiable content of the residue to form a stabilizer for the larger and unsaponifiable fraction and such other unsaponifiable sizing agent as may have entered into the melt. It might be noted that despite the fact that the residue may be greatly diluted with other substantially inert or unsaponifiable sizing agents, such as hydrocarbon bodies, it furnishes upon reaction with caustic soda solution a sufficiently potent stabilizer to maintain both the unsaponified fraction and such other agents stably emulsified in fine particle size.

I shall now describe the preparation of various paper-sizes embodying the pyrogenous residue as a sizing ingredient and the uses to which they may be put. In all of the examples to be described, the distilled residue employed was derived from spent soda pulping liquors in which Southern pine had been reduced to pulp. The residue had the following characteristics:—

| | |
|---|---|
| Melting point | 140–145° F. |
| Penetration (A. S. T. M. 50–5–77) | 40–60 |
| Acid number | 53 |

*Example 1—Uncombined with other sizing materials*

The formula for such emulsions may be:—

| | Parts |
|---|---|
| Pyrogenous residue | 40 |
| 2.7% caustic soda solution | 60 |

In producing the emulsion, the distilled residue may be heated to 200° F., and the caustic soda solution may be independently heated to 180° F. The residue so heated is poured into the hot caustic soda solution with vigorous stirring. The resulting emulsion is of 40% solids content and is quite viscous when cold. The emulsion may be used advantageously as a size in dark-colored papers or boards, such as kraft paper, boards, and similar products. The emulsion may be added in the desired amount to papermaking stock in the beater engine and the emulsified size precipitated on the stock by alum or its equivalent before the stock is delivered to the papermaking machine. Papers thus sized with the pyrogenous residue are possessed of softness, pliability, and other qualities which cannot be obtained through the use of rosin size.

*Example 2—Combined with asphalt*

The formula for such an emulsion may be:—

| | Parts |
|---|---|
| Asphalt | 36 |
| Pyrogenous residue | 4 |
| .5% caustic soda solution | 60 |

In preparing the emulsion, the distilled residue and asphalt may be melted together and brought to 220° F. and the caustic soda solution may be independently heated to 200° F. The melt may then be poured into the hot caustic soda solution with vigorous stirring to produce a fine particle size emulsion of 40% solids content size and quite liquid when cold. The emulsion may be employed to advantage in the production of paper boards, such as automobile panel boards. One of the advantages of such an emulsion is that it can be added to papermaking stock in amount to produce boards containing as much as 40% to 50% sizing solids, based on the dry weight of fiber, without any papermaking difficulties. Of course, the size should be precipitated on the papermaking stock before delivery of the stock to the papermaking machine.

*Example 3—Combined with waxes*

The formula for this type of emulsion may be:—

| | Parts |
|---|---|
| Pyrogenous residue | 20 |
| High melting point amorphous hydrocarbon wax | 20 |
| Crude Montan wax | 10 |
| 2% caustic soda solution | 50 |

In producing this emulsion, the distilled residue and waxes may be melted and heated to 220° F. and the caustic soda solution may be independently heated to 180° F. The melt may be poured into the hot caustic soda solution with vigorous stirring to produce a fine particle size emulsion of 50% solids content which assumes the form of a thick paste when cold. Such an emulsion may be used in the production of wax-sized papers in the usual manner. Not only does it have a sizing or water-repelling effect on the paper similar to that realized from the usual wax sizes, but it is considerably less expensive per unit sizing value obtained in the paper.

*Example 4—Combined with rosin*

The formula for such an emulsion may be:—

| | Parts |
|---|---|
| Pyrogenous residue | 30 |
| Rosin | 20 |
| 7.2% caustic soda solution | 50 |

In preparing the emulsion, the distilled residue and rosin may be melted together and heated to 220° F. and the caustic soda solution may be independently heated to 200° F. The melt may be poured into the hot caustic soda solution with vigorous stirring to produce a fine particle size emulsion of 50% solids content whose consistency is similar to that of the usual commercial rosin size. Such an emulsion can be used to advantage in replacing the usual rosin size in the sizing of papers, since it yields papers whose strength and rigidity qualities are better than those realized through the use of the emulsion described in Example 1.

*Example 5—Combined with rosin and wax*

The formula for such an emulsion may be:—

| | Parts |
|---|---|
| Pyrogenous residue | 10 |
| Rosin | 45 |
| High melting point amorphous hydrocarbon wax | 45 |
| 3.8% caustic soda solution | 150 |

In producing this emulsion, the distilled residue, rosin, and wax may be melted together and heated to 230° F. and the caustic soda solution may be independently heated to 200° F. The melt may be mixed intimately with the hot solution and the mixture then passed through a colloid mill or homogenizer to produce an emulsion of the desired fine particle size. The resulting emulsion is of 45% solids content and is very liquid when cold. Such an emulsion can be used as hereinbefore described in the sizing of various kinds of paper products. Its sizing or water-repelling value in paper products is much superior to that of ordinary rosin size.

It is to be understood that the foregoing examples are merely illustrative of the wide variety of paper-sizing compositions and sized paper products that may be produced in accordance with the present invention. Thus, it is possible to vary the proportions of the various ingredients and the ingredients used in the compositions and in the paper products. However, all compositions embodying the present invention contain pyrogenous residue therein as an ingredient which has both high sizing value and a content of saponifiable matter which when saponified by caustic soda or equivalent alkali, as is done pursuant to the present invention, yields a highly effective stabilizer, namely, a stabilizer capable of maintaining the preponderant unsaponified portion of the residue stably emulsified in fine particle size along with, if desired, a large amount of other substantially unsaponifiable sizing, such as asphalt, hydrocarbon wax, etc. It is possibly by reason of the relatively low soap or stabilizer content that the sizing compositions of the present invention have such good sizing value.

It might be mentioned that the oleaginous precipitate produced by acid-treating resin and fatty acid soap salted out and removed from concentrated spent chemical pulping liquors, such as spent soda cooking liquor, is, as hereinbefore indicated, sometimes known as "tallol". "Tallol" is exceedingly complex in its composition, being made up of various fractions which can be separated by distillation, including an almost pure solid rosin fraction and also a liquid fraction high in fatty acids and salable as a substitute for red oil. Preliminary to the present invention, I did considerable experimental and research work with a view toward determining the value of "tallol" for paper-sizing purposes. In the course of such work, I found that "tallol" had some value as a rosin-softening or rosin-fluxing agent but that it alone had such little sizing or water-repelling effect on paper that, as a practical matter, it could not be considered as a paper-sizing material in the same sense as such materials as rosin, wax, and asphalt. Upon continuing my work with a view toward evaluating for paper-sizing purpose the fractions of "tallol" into which the "tallol" could be separated by distillation, I made the discovery hereinbefore described, namely, that the pyrogenous or substantially involatile residue left in the still as a result of the distillation of "tallol" had remarkable paper-sizing ability,—an ability hardly to be expected, considering the low degree of sizing or water-repellency obtained in paper through the use therein of the parent material, that is, the "tallol".

I claim:—

1. In the manufacture of sized paper products wherein substantially involatile, thermoplastic, pyrogenous residue, obtained from the distillation of the liquid resin separated from spent alkaline pulping liquor resulting from the pulping of pinewood, appears as a sizing ingredient, those steps which comprise intimately commingling such residue in molten condition with an alkaline aqueous liquor to effect an emulsification of such residue, incorporating the resulting emulsion into papermaking stock, and forming paper from the stock.

2. In the manufacture of sized paper products wherein substantially involatile, thermoplastic, pyrogenous residue, obtained from the distillation of the liquid resin separated from spent alkaline pulping liquor resulting from the pulping of pinewood, appears as a sizing ingredient, those steps which comprise intimately commingling such residue in molten condition with an alkaline aqueous liquor to effect an emulsification of such residue, incorporating the resulting emulsion into papermaking stock, precipitating the emulsified residue on the stock, and forming paper from the stock.

3. In the manufacture of sized paper products containing substantially involatile, thermoplastic, pyrogenous residue, which is obtained from the distillation of the liquid resin separated from spent alkaline liquor resulting from the pulping of pinewood, blended with other thermoplastic size, those steps which comprise commingling such blend in molten condition with an alkaline aqueous liquor to effect an emulsification of the blend and to form a saponified residue portion serving as stabilizer for the emulsion, incorporating the resulting emulsion into papermaking stock, precipitating the emulsified blend on the stock, and forming paper from the stock.

4. In the manufacture of sized paper products containing substantially involatile, thermoplastic, pyrogenous residue, which is obtained from the distillation of the liquid resin separated from spent alkaline pulping liquor resulting from the pulping of pinewood, blended with thermoplastic hydrocarbon wax, those steps which comprise commingling such blend in molten condition with an aqueous solution of a saponifying agent to saponify saponifiable content of said residue and to effect an emulsification of the blend in an aqueous medium containing the saponified residue portion as a stabilizer for the emulsion, incorporating the resulting emulsion into papermaking stock, precipitating the emulsified blend on the stock, and forming paper from the stock.

5. In the manufacture of sized paper products containing substantially involatile, thermoplastic, pyrogenous residue, which is obtained from the distillation of the liquid resin separated from spent alkaline pulping liquor resulting from the pulping of pinewood, blended with thermoplastic hydrocarbon wax, those steps which comprise melting said residue together with a preponderant proportion of the thermoplastic hydrocarbon size, commingling the resulting blend in molten condition with an aqueous solution of a saponifying agent to saponify saponifiable content of said residue and to effect an emulsification of the blend in an aqueous medium containing the saponified residue portion as a stabilizer for the emulsion, incorporating the resulting emulsion into papermaking stock, precipitating the emulsified blend on the stock, and forming paper from the stock.

6. In the manufacture of sized paper products containing substantially involatile, thermoplastic, pyrogenous residue, which is obtained from the distillation of the liquid resin separated from spent alkaline pulping liquor resulting from the pulping of pinewood, blended with asphalt, those steps which comprise commingling a blend of said residue and asphalt in molten condition with an alkaline aqueous liquor to effect an emulsification of the blend and to form a saponified residue portion serving as stabilizer for the emulsion, incorporating the resulting emulsion into papermaking stock, precipitating the emulsified blend on the stock, and forming paper from the stock.

7. In the manufacture of sized paper products containing substantially involatile, thermoplastic, pyrogenous residue, which is obtained from the distillation of the liquid resin separated from spent alkaline pulping liquor resulting from the pulping of pinewood, blended with hydrocarbon wax, those steps which comprise commingling a blend of said residue and hydrocarbon wax in molten condition with an alkaline aqueous liquor to effect an emulsification of the blend and to form a saponified residue portion serving as stabilizer for the emulsion, incorporating the resulting emulsion into papermaking stock, precipitating the emulsified blend on the stock, and forming paper from the stock.

8. A sized paper product at least part of whose size content is substantially involatile, thermoplastic, pyrogenous residue precipitated in large measure in unsaponified condition on the fibers of said product from aqueous emulsion, said residue being that remaining from the distillation of the liquid resin separated from spent alkaline pulping liquor resulting from the pulping of pinewood.

9. A sized paper product whose size content comprises substantially involatile, thermoplastic, pyrogenous residue precipitated in large measure in unsaponified condition on the fibers of said product in substantially uniform admixture with another size from aqueous emulsion, said residue being that remaining from the distillation of the liquid resin separated from spent alkaline pulping liquor resulting from the pulping of pinewood.

10. A sized paper product whose size content comprises substantially involatile, thermoplastic, pyrogenous residue precipitated in large measure in unsaponified condition on the fibers of said product in substantially uniform admixture with rosin from aqueous emulsion, said residue being that remaining from the distillation of the liquid resin separated from spent alkaline pulping liquor resulting from the pulping of pinewood.

11. A sized paper product whose size content comprises substantially involatile, thermoplastic, pyrogenous residue precipitated in large measure in unsaponified condition on the fibers of said product in substantially uniform admixture with a thermoplastic hydrocarbon from aqueous emulsion, said residue being that remaining from the distillation of the liquid resin separated from spent alkaline pulping liquor resulting from the pulping of pinewood.

12. A sized paper product whose size content comprises substantially involatile, thermoplastic, pyrogenous residue precipitated in large measure in unsaponified condition on the fibers of said product in substantially uniform admixture with a preponderant proportion of thermoplastic hydrocarbon from aqueous emulsion, said residue being that remaining from the distillation of the liquid resin separated from spent alkaline pulping liquor resulting from the pulping of pinewood.

13. A sized paper product whose size content comprises substantially involatile, thermoplastic, pyrogenous residue precipitated in large measure in unsaponified condition on the fibers of said product in substantially uniform admixture with asphalt from aqueous emulsion, said residue being that remaining from the distillation of the liquid resin separated from spent alkaline pulping liquor resulting from the pulping of pinewood.

14. A sized paper product whose size content comprises substantially involatile, thermoplastic, pyrogenous residue precipitated in large measure in unsaponified condition on the fibers of said product in substantially uniform admixture with hydrocarbon wax from aqueous emulsion, said residue being that remaining from the distillation of the liquid resin separated from spent alkaline pulping liquor resulting from the pulping of pinewood.

OSCAR F. NEITZKE.